United States Patent
Gunawan

(10) Patent No.: US 10,460,863 B2
(45) Date of Patent: Oct. 29, 2019

(54) PARALLEL DIPOLE LINE TRAP WITH VARIABLE GAP AND TUNABLE TRAP POTENTIAL

(71) Applicant: International Business Machines Corporation, Armonk, NY (US)

(72) Inventor: Oki Gunawan, Westwood, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/964,819

(22) Filed: Apr. 27, 2018

(65) Prior Publication Data

US 2018/0247748 A1   Aug. 30, 2018

Related U.S. Application Data

(63) Continuation of application No. 15/131,566, filed on Apr. 18, 2016, now Pat. No. 9,978,493.

(51) Int. Cl.
*H01F 7/20* (2006.01)
*H01F 7/02* (2006.01)
*H02N 15/00* (2006.01)
*H01J 49/00* (2006.01)

(52) U.S. Cl.
CPC ............ *H01F 7/0236* (2013.01); *H01J 49/00* (2013.01); *H02N 15/00* (2013.01)

(58) Field of Classification Search
CPC .................................................... H01F 7/0236
USPC ................................................. 335/285, 306
See application file for complete search history.

(56) References Cited

U.S. PATENT DOCUMENTS

| | | | | |
|---|---|---|---|---|
| 3,196,566 A | * | 7/1965 | Littlefield | G09F 19/12 335/295 |
| 3,383,141 A | | 5/1968 | De Bennetot | |
| 3,597,022 A | * | 8/1971 | Waldron | F16C 32/0436 310/90.5 |
| 4,643,604 A | * | 2/1987 | Enrico | B43K 29/00 206/371 |
| 4,672,346 A | * | 6/1987 | Miyamoto | B29C 67/20 335/296 |
| 5,165,347 A | * | 11/1992 | Wagner | B60L 13/06 104/283 |

(Continued)

OTHER PUBLICATIONS

Gunawan et al., "A parallel dipole line system," Applied Physics Letters 106, pp. 062407-1-062407-5 (Feb. 2015).

(Continued)

*Primary Examiner* — Alexander Talpalatski
(74) *Attorney, Agent, or Firm* — Vazken Alexanian; Michael J. Chang, LLC

(57) ABSTRACT

Techniques for tuning magnetic potential using a variable gap in a parallel dipole line (PDL) trap are provided. In one aspect, a PDL trap is provided. The PDL trap includes: a pair of dipole line magnets separated from one another by a variable gap g; and a diamagnetic object levitating above the dipole line magnets. The dipole line magnets can be separated from one another by at least one spacer, or a variable gap fixture can be used in which the dipole line magnets are affixed to separate mounts for varying the gap g between the dipole line magnets. A bigger trap or track can be built with multiple segments of PDL trap. A method of operating a PDL trap is also provided.

14 Claims, 10 Drawing Sheets

(56) References Cited

U.S. PATENT DOCUMENTS

| | | | | |
|---|---|---|---|---|
| 5,168,183 | A * | 12/1992 | Whitehead | F16C 32/044 104/284 |
| 5,243,314 | A * | 9/1993 | Maruyama | B23Q 3/1546 269/8 |
| 5,506,459 | A * | 4/1996 | Ritts | A63H 1/00 310/90.5 |
| 5,638,340 | A * | 6/1997 | Schiefele | G04B 17/02 368/179 |
| 5,726,512 | A * | 3/1998 | Chu | F16C 32/0438 310/90.5 |
| 5,974,977 | A * | 11/1999 | Johnson | A63H 18/10 104/281 |
| 6,359,767 | B1 * | 3/2002 | Ooyama | F01L 9/04 267/140.15 |
| 6,633,217 | B2 * | 10/2003 | Post | B60L 13/04 104/281 |
| 6,761,610 | B2 * | 7/2004 | Fisher | A63H 33/26 335/306 |
| 7,501,922 | B2 * | 3/2009 | Kazadi | F16C 32/0429 335/284 |
| 7,597,002 | B2 | 10/2009 | Moser et al. | |
| 8,169,114 | B2 | 5/2012 | Simon | |
| 8,895,355 | B2 | 11/2014 | Cao et al. | |
| 9,041,389 | B2 | 5/2015 | Gokmen et al. | |
| 9,093,377 | B2 | 7/2015 | Cao et al. | |
| 9,236,293 | B2 | 1/2016 | Cao et al. | |
| 9,263,669 | B2 | 2/2016 | Cao et al. | |
| 9,576,853 | B2 * | 2/2017 | Cao | H01L 21/283 |
| 2003/0173833 | A1 * | 9/2003 | Hazelton | G03F 7/70716 310/12.06 |
| 2008/0266037 | A1 | 10/2008 | Williams | |
| 2014/0136133 | A1 * | 5/2014 | Gokmen | H02S 50/10 702/65 |
| 2014/0266264 | A1 * | 9/2014 | Gunawan | G01N 27/04 324/691 |
| 2014/0273450 | A1 * | 9/2014 | Cao | H01L 21/02697 438/674 |
| 2015/0037128 | A1 * | 2/2015 | Kustler | B01L 3/502792 414/749.2 |

OTHER PUBLICATIONS

Gunawan et al., "A Diamagnetic Trap with 1D Camelback Potential," arXiv preprint, arXiv:1405.5220, May 2014 (5 pages).

M. Boukallel et al., "Levitated micro-nano force sensor using diamagnetic materials," International Conference on Robotics and Automation, Sep. 2003, vol. 3, pp. 3219-3224.

Z. Chen et al., "Deformation of water by a magnetic field," The Physics Teacher, vol. 49, No. 3, Mar. 2011, pp. 144-146.

K.T. Mc Donald, Ph501 Electrodynamics, Problem Set 5, Princeton University, 1999 (40 pages).

List of IBM Patents or Applications Treated as Related (2 pages).

* cited by examiner

Cross section

Top view

US 10,460,863 B2

PARALLEL DIPOLE LINE TRAP WITH VARIABLE GAP AND TUNABLE TRAP POTENTIAL

CROSS-REFERENCE TO RELATED APPLICATION(S)

This application is a continuation of U.S. application Ser. No. 15/131,566 filed on Apr. 18, 2016, now U.S. Pat. No. 9,978,493, the disclosure of which is incorporated by reference herein.

FIELD OF THE INVENTION

The present invention relates to magnetic parallel dipole line (PDL) trap systems, and more particularly, to techniques for tuning magnetic potential using a variable gap in a PDL trap.

BACKGROUND OF THE INVENTION

Electromagnetic and optical trap systems play an important role in physics: such as Penning trap, Linear Ion (Paul) trap, magneto-optic trap, optical trap and diamagnetic trap. They are used to isolate matter which enables various high precision measurements to extract the intrinsic property of the matter and to perform various fundamental experiments in physics.

One such system that has been recently developed is a parallel dipole line (PDL) trap. A PDL trap enables trapping of a diamagnetic cylindrical object using transversely magnetized magnets that serve as the PDL system. The key feature of the trap is the "camelback magnetic potential" along the longitudinal axis that provides stable trapping. See, for example, Gunawan et al., "A parallel dipole line system," Applied Physics Letters 106, pp. 062407-1-5 (February 2015) (hereinafter "Gunawan"); and U.S. Pat. Nos. 8,895,355, 9,093,377, and 9,236,293 all issued to Cao et al., entitled "Magnetic Trap for Cylindrical Diamagnetic Materials."

The magnetic field profile (i.e., the camelback potential) along the longitudinal axis is fixed due to fixed length (L) and radius (a) and magnetization (M) of the magnet. However, for some applications it would be desirable to be able to control this magnetic field profile and potential.

SUMMARY OF THE INVENTION

The present invention provides techniques for tuning magnetic potential using a variable gap in a parallel dipole line (PDL) trap. In one aspect of the invention, a PDL trap is provided. The PDL trap includes: a pair of dipole line magnets separated from one another by a variable gap g; and a diamagnetic object levitating above the dipole line magnets. The dipole line magnets can be separated from one another by at least one spacer, or a variable gap fixture can be used in which the dipole line magnets are affixed to separate mounts for varying the gap g between the dipole line magnets.

In another aspect of the invention, a system is provided. The system includes: multiple PDL traps combined to form a dipole line track system, wherein each of the PDL traps includes a pair of dipole line magnets separated from one another by a variable gap g, and a diamagnetic object levitating above the dipole line magnets, and wherein a longitudinal axis of the dipole line magnets of at least one of the PDL traps is curved.

In yet another aspect of the invention, a method of operating a PDL trap is provided. The method includes the steps of: providing the PDL trap having a pair of dipole line magnets, and a diamagnetic object levitating above the dipole line magnets; and opening a gap g between the dipole line magnets.

A more complete understanding of the present invention, as well as further features and advantages of the present invention, will be obtained by reference to the following detailed description and drawings.

DETAILED DESCRIPTION OF PREFERRED EMBODIMENTS

Provided herein are techniques for tuning a magnetic potential in a parallel dipole line (PDL) trap system by changing a gap between the magnets. As will be described in detail below, this can serve to change a levitation height of the trapped object, vary the magnetic field at the trapped object, as well as open up space between the magnets to fit more apparatus and/or to conduct experiments (such as those requiring that an optical beam pass between the magnets). The details of a PDL trap system as they pertain to the present techniques will become apparent from the description provided below. In general however, a PDL trap consists of a magnetic parallel dipole line system made of a pair of transversely magnetized (also called diametric) cylindrical magnet that naturally join together. The magnets have an elongated shape such as a cylinder, bar, or stripe, whose magnetization is in the transverse direction (perpendicular to the long axis). These magnets will be referred to herein as "dipole line" or "diametric" magnets. A diamagnetic cylindrical object such as a graphite rod can be trapped at the center. See, for example, Gunawan and U.S. Pat. Nos. 8,895,355; 9,093,377; and 9,236,293, the contents of each of which are incorporated by reference as if fully set forth herein. The diamagnetic cylindrical object will levitate above the pair of diametric magnets. The key discovery and the central feature of the PDL trap is the existence of "camelback magnetic potential" along the longitudinal (z-axis), i.e., magnetic field enhancement near the edge of the dipole line which occurs for diametric magnet with length exceeding the critical length $L_C$ where $L_C \sim 2.5a$ for a pair of cylindrical diametric magnet system, wherein a is the radius of the magnet.

Figure 1:
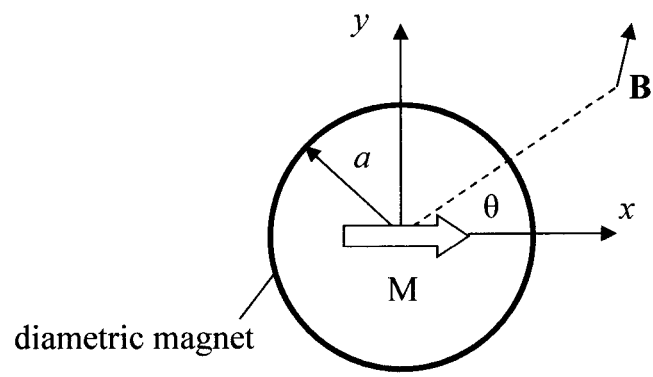
FIG. 1 is a diagram illustrating the parameters for modeling the magnetic field of diametric magnet in two-dimensions (2D) according to an embodiment of the present invention.

In order to understand the present techniques, one must analyze the magnetic field of a dipole line or cylindrical diamagnetic magnet system. The magnetic field B of a very long (L>>a) cylindrical diametric magnet ($B_{DM}$) in two dimensions (2D) has been given by K. T. Mc Donald, Ph501 Electrodynamics, Problem Set 5, Princeton University, 1999 (40 pages), the contents of which are incorporated by reference as if fully set forth herein, as:

$$B_{DM}(x, y) = \frac{\mu_0 M a^2}{2(x^2+y^2)^2}[(x^2-y^2)\hat{x} + 2xy\hat{y}] \quad (1)$$

wherein M is the volume magnetization of the magnet and $\mu_0$ is the magnetic permeability in vacuum. See, for example, FIG. 1.

Figure 2:
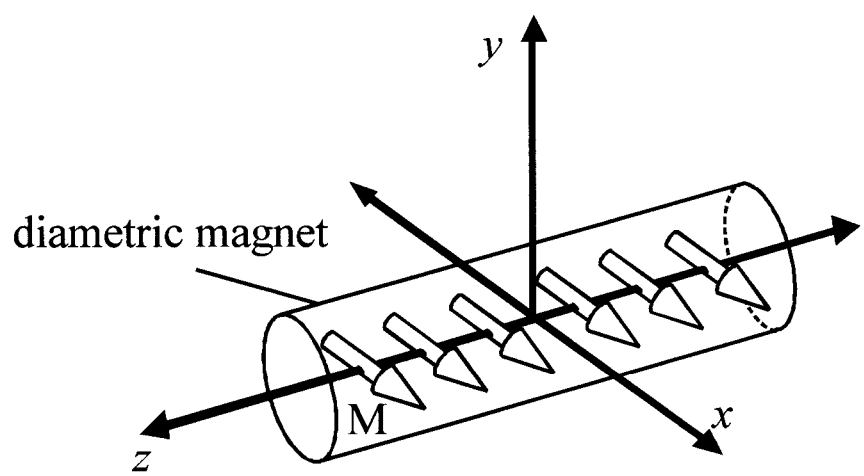
FIG. 2 is a diagram illustrating the parameters for modeling the magnetic field of diametric magnet in three-dimensions (3D) according to an embodiment of the present invention.

The magnetic field of a diametric magnet with finite length L in three-dimensions (3D) is given in Gunawan as:

$$B_{DM}(x, y, z) = \frac{\mu_0 M a}{4\pi} \int_0^{2\pi} \sum_{n=1,2} \frac{(-1)^n}{u_n^2+s^2+u_n\sqrt{u_n^2+s^2}} \begin{bmatrix} x-a\cos\phi \\ y-a\sin\phi \\ u_n+\sqrt{u_n^2+s^2} \end{bmatrix} \cos\phi d\phi \quad (2)$$

wherein $s^2=(x-a\cos\phi)^2+(y-a\sin\phi)^2$ and $u_{1,2}=z\pm L/2$. See, for example, FIG. 2.

Figure 3:
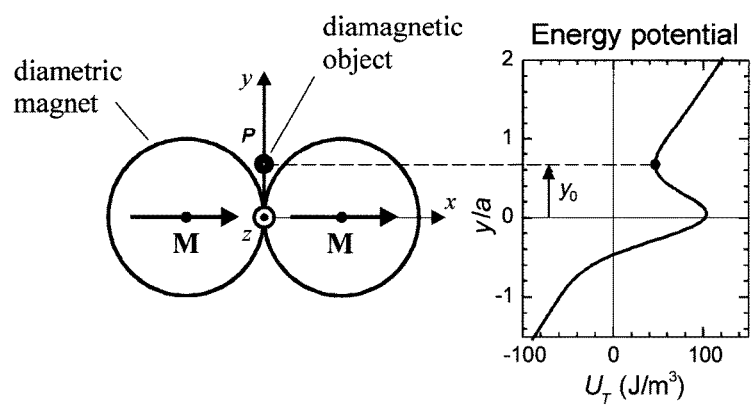
FIG. 3 is a diagram illustrating the energy potential of the levitating objected trapped in a parallel dipole line (PDL) trap according to an embodiment of the present invention.

As provided above, the diamagnetic cylindrical object will levitate above the pair of diametric magnets in the PDL trap as shown in FIG. 3. The 2D model of the magnetic field is sufficient to describe the levitating effect of the object at the center of the trap at equilibrium height $y_0$. This height $y_0$ can be solved from the equation given in Gunawan as:

$$\frac{\rho g_0 a}{\mu_0 M^2} \frac{\chi+2}{\chi} + f_Y(\overline{y}_0, \overline{L}) = 0 \quad (3)$$

wherein for a long magnet (L>>a): $f_Y(\overline{y})=8\overline{y}(3-\overline{y}^2)$ $(1-\overline{y}^2)/(1+\overline{y}^2)^5$ with $\overline{y}=y/a$, $\chi$ is the magnetic susceptibility of the rod, $\rho$ is the mass density of the rod, $g_0$ is gravitational acceleration.

The external magnetic field of a long cylindrical diametric magnet is identical with the field of a dipole line system with dipole pointing in a transverse direction. This is analogous with the fact that the external field of a uniformly magnetized sphere is equal to a point dipole. The field of a diametric magnet or a dipole line system in Equation 1 can be written (in polar coordinate) as:

$$B_{DL} = \frac{\mu_0 m_L}{2\pi r^2}(\cos\theta\hat{r} + \sin\theta\hat{\theta}) \quad (4)$$

wherein $m_L=M\pi a^2$ is the magnetic dipole per unit length and $r=\sqrt{x^2+y^2}$.

Figure 4:
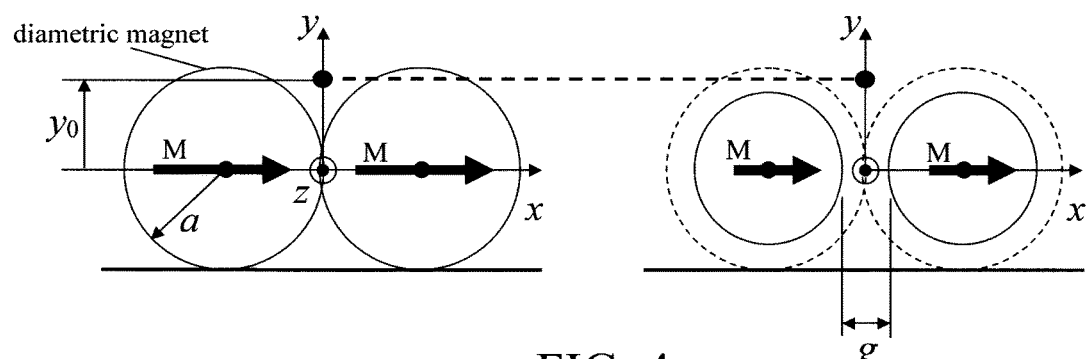
FIG. 4 is a diagram illustrating a gap g having been opened between the cylindrical magnets in a PDL trap according to an embodiment of the present invention.
Figure 5:
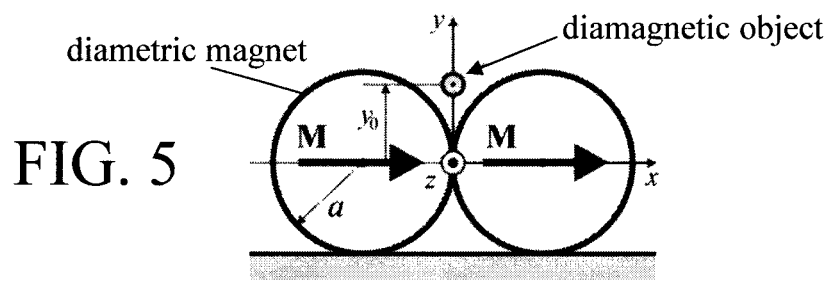
FIG. 5 is a diagram illustrating a trapped object levitating over a PDL trap with the magnets in contact according to an embodiment of the present invention.

Thus, as long as dipole strength per unit length ($m_L$) is the same, the magnetic field is identical. This means that the cylindrical magnets in a PDL trap do not have to be in contact with one another. A gap g can be opened between the magnets (see FIG. 4) and the field distribution will be identical except scaled down by a constant (and the trapped object will levitate lower). This idea can be leveraged to control the height at which the trapped object levitates above the trap by controlling the (variable) gap between the magnets.

Figure 6:
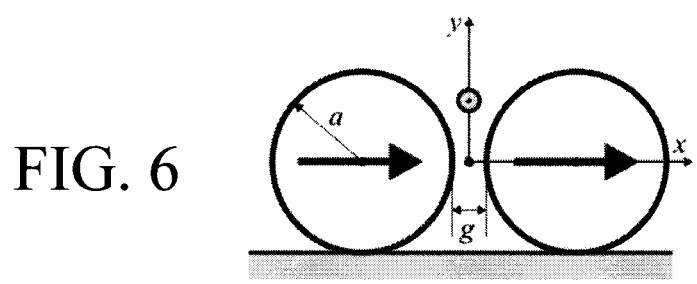
FIG. 6 is a diagram illustrating a gap g having been opened between the magnets which lowers the levitating trapped object according to an embodiment of the present invention.
Figure 7:
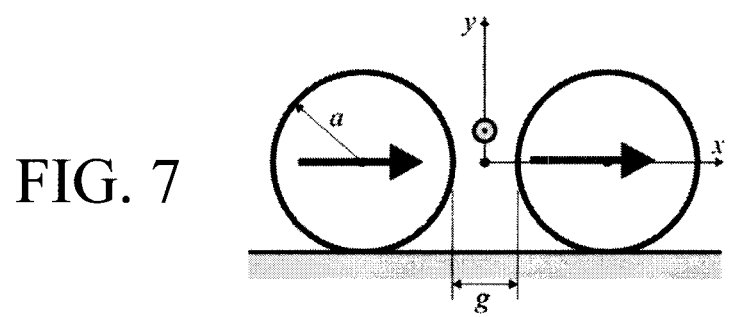
FIG. 7 is a diagram illustrating the gap having been increased to g' which further lowers the levitating trapped object according to an embodiment of the present invention.
Figure 8:
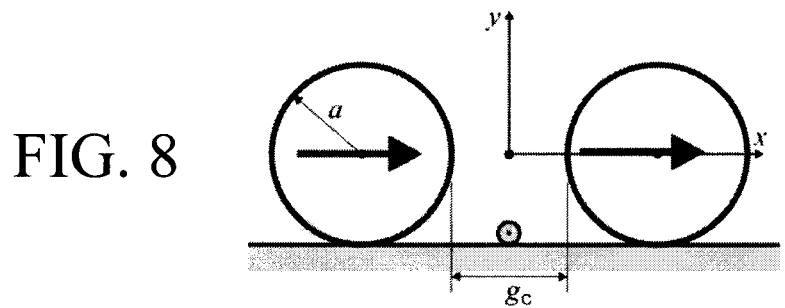
FIG. 8 is a diagram illustrating the gap having been increased to a critical gap $g_C$, at which point the object falls through the trap according to an embodiment of the present invention.

Namely, as shown in FIGS. 5-8, beginning from a configuration where the magnets are touching (no gap—FIG. 5), a gap g is introduced between the magnets (FIG. 6). As the gap g is increased, e.g., from g to g' (FIG. 7) where g>g', the height of levitated rod ($y_0$) decreases (i.e., the rod is lowered) until the object falls at a critical gap $g_C$ (FIG. 8) where g>g'>$g_C$.

Figure 9:
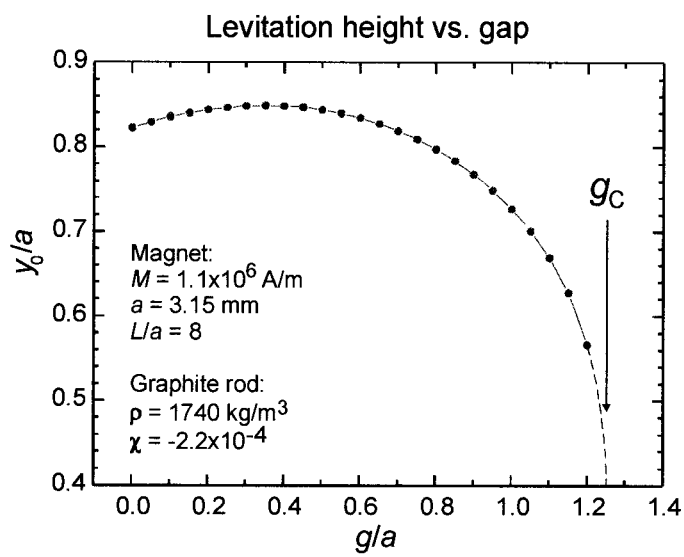
FIG. 9 is a diagram illustrating levitation height of the trapped object as a function of the gap g according to an embodiment of the present invention.
Figure 10:
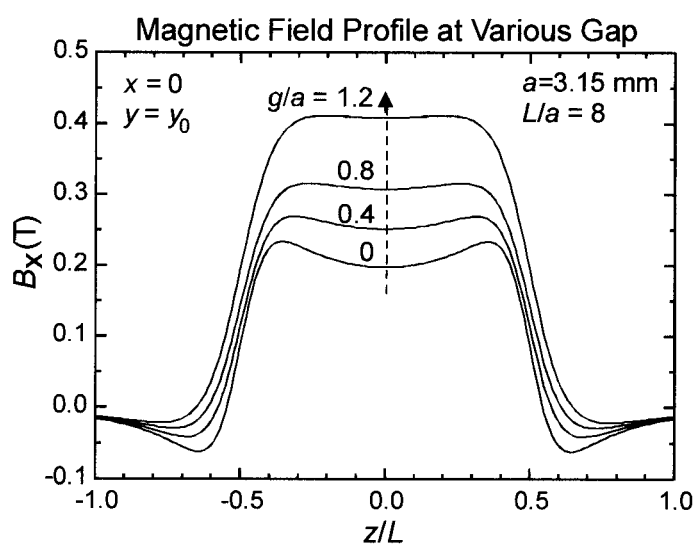
FIG. 10 is a diagram illustrating longitudinal magnetic field profile as a function of the gap g according to an embodiment of the present invention.
Figure 11:
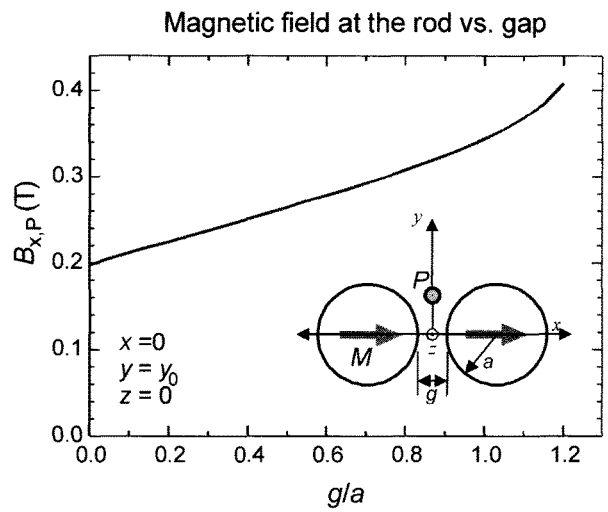
FIG. 11 is a diagram illustrating the magnetic field at the trapped object as a function of the gap g according to an embodiment of the present invention.

FIG. 9 is a diagram illustrating the levitation height (of the trapped object) as a function of gap g. As shown in FIG. 9, the levitation height increases with an increasing gap g until the critical gap $g_C$ is reached and the object falls through the trap. In FIG. 9, the levitation height $y_0$ and gap g are measured relative to the radius of the magnet a. See also FIGS. 10 and 11 which show the longitudinal magnetic field and magnetic field at the trapped object, respectively, as a function of the gap g.

Based on the above, it has been found herein that the gap between the two magnets can be controlled to achieve several notable benefits. For instance, as provided above, the gap can be used to control the levitation height of the trapped object. Varying the gap can also be used to control the maximum magnetic field at the trapped object (see FIG. 11), to control the magnetic field profile along the longitudinal axis (z) and its associated confinement potential "spring constant" $k_X$, $k_Y$, $k_Z$, and to open up space to fit in various apparatus or experiments, e.g., allowing optical beam to pass vertically for object detection. The spring constant of the potential confinement in certain direction is given as the second derivative of the confinement potential at the equilibrium point: $k_u = \partial U_T^2(u)/\partial u^2$ wherein u is the spatial dimension x, y or z.

In order to keep the trapped object levitated (as opposed to having the object fall through the trap), the gap g must be kept less than the critical gap $g_C$, i.e., g<$g_C$. For a PDL trap, the critical gap $g_C$ beyond which the trapped object is no longer levitated is given as:

$$g_C = 2\sqrt[5]{\frac{-2.069\mu_0 M^2 a^4 \chi}{\rho g(2+\chi)}} - 2a \quad (5)$$

Alternatively, one can continuously open the gap until the object falls, and use this critical gap value to determine the magnetic susceptibility of the object:

$$\chi_{min} = -\frac{2}{1 + \frac{2.069\mu_0 M^2 a^4}{\rho g(a + g_C/2)^5}}. \quad (6)$$

Figure 12:
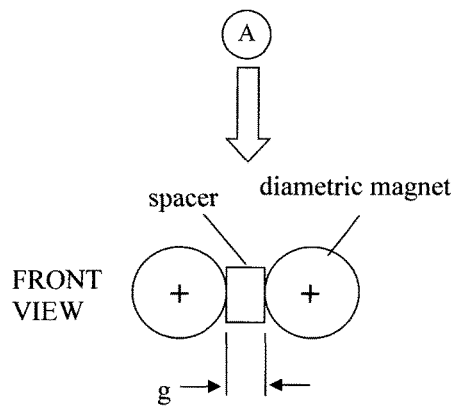
FIG. 12 is a diagram illustrating a front view a fixed spacer being used to create a gap between the magnets according to an embodiment of the present invention.
Figure 13:
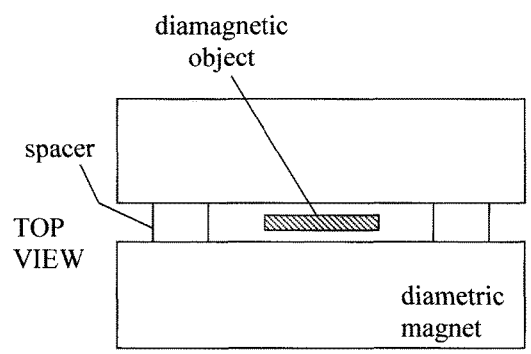
FIG. 13 is a diagram illustrating a top view the fixed spacer being used to create a gap between the magnets according to an embodiment of the present invention.

Several techniques are provided herein for applying a variable gap in the PDL trap. In a first exemplary embodiment, a fixed (dimension) spacer is used between the magnets. See, for example, FIG. 12 (front view) and FIG. 13 (top view, i.e., from viewpoint A—see FIG. 12). As shown in FIGS. 12 and 13, solid, fixed spacers are inserted between the diametric magnets. Suitable spacers are non-ferromagnetic materials including, but not limited to, plastic, metal, and wood. Ferromagnetic materials may distort the field distribution in the trap. Due to a strong attractive force between the magnets, the spacers are clamped tightly in the space between the magnets, and generally do not need additional means for holding the spacers in place. Different width spacers can be easily swapped out to obtain a different size gap. Thus, this technique is easy to implement at a low cost. However, using a fixed spacer does not allow for fine variable gap adjustments.

Figure 14:
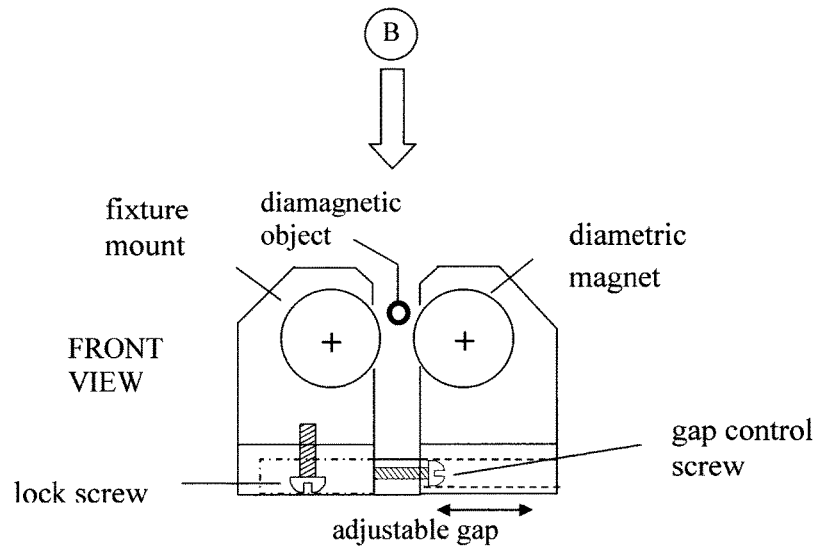
FIG. 14 is a diagram illustrating a front view of a variable gap fixture according to an embodiment of the present invention.
Figure 15:
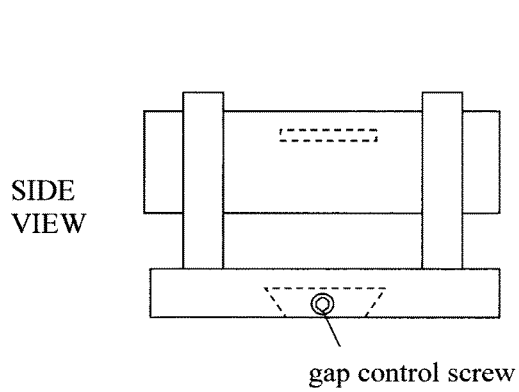
FIG. 15 is a diagram illustrating a side view of the variable gap fixture according to an embodiment of the present invention.
Figure 16:
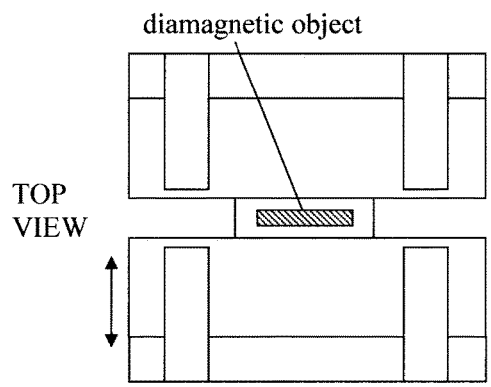
FIG. 16 is a diagram illustrating a top view of the variable gap fixture according to an embodiment of the present invention.

Thus, according to another exemplary embodiment, a fixed or a variable gap fixture is presented that affixes each of the magnets of the PDL trap to separate mounts. For a variable gap fixture the mounts can be adjustable. See, for example, FIG. 14 (front view), FIG. 15 (side view), and FIG. 16 (top view, i.e., from viewpoint B—see FIG. 14). As shown in FIGS. 14-16, the positioning of the mounts (to which the magnets are attached) relative to one another can be changed using an adjustable screw (or other similar mechanism) that connects one mount to the other. For instance, according to an exemplary embodiment, there is a screw on the side of the structure that, when turned, moves one side of the fixture (closer to or farther from the other side of the fixture) thus controlling the gap. Additional screw(s) to lock the position of the fixture can also be provided so as to overcome the strong pulling force between the magnets.

In either case, fixed spacer or variable gap fixture, the gap g opened between the magnets is preferably consistent along the length of the magnets, i.e., the same gap g is present between the magnets at one end of the PDL trap as at the other opposite end of the trap. This configuration places the magnets in a non-contact position relative to one another, i.e., the magnets are adjacent to one another, but are separated by a (constant) gap g which places the magnets in a non-contact position with one another.

Figure 17:
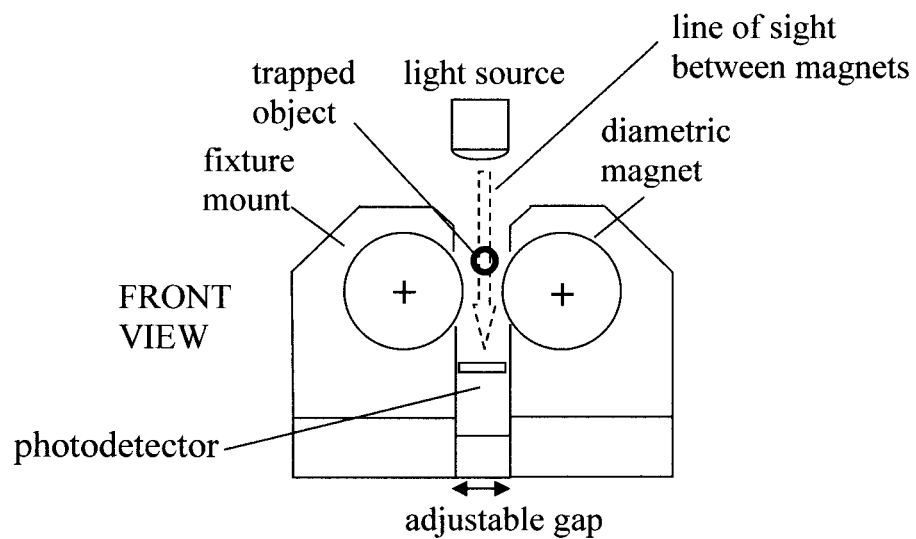
FIG. 17 is a diagram illustrating a front view of a PDL trap with a gap g introduced between the magnets which opens a line-of-sight between the magnets from a top of the PDL trap to the bottom where, for example, a light source and photodetectors can be employed to determine a position of the trapped object according to an embodiment of the present invention.

As provided above, one advantage of introducing a gap between the magnets in a PDL trap is that this gap permits additional components to be placed within the PDL trap. For instance, in one exemplary embodiment, introducing a gap g between the magnets opens a line-of-sight between the magnets from a top of the PDL trap to the bottom. See, for example, FIG. 17 (front view) and FIG. 18 (side view). This configuration provides more space that enables a variety of different apparatuses to be employed in the trap. For instance, in the example shown in FIGS. 17 and 18, a light source and photodetectors are placed (above and below) the trap, respectively. A suitable light source includes, but is not limited to, incandescent light bulb, light emitting diode and/or laser, and suitable photodetectors include, but are not limited to, semiconductor photodetector and/or light-dependent-resistor (LDR).

Figure 18:
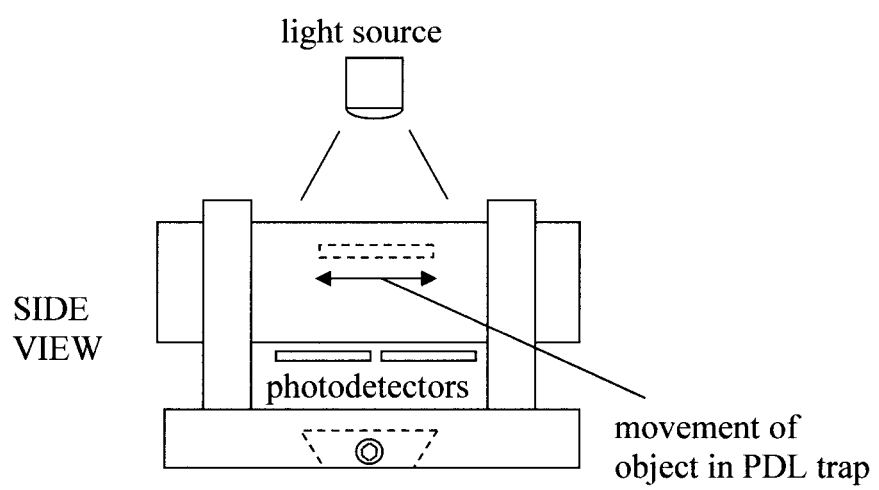
FIG. 18 is a diagram illustrating a side view of the PDL trap with the gap g and the light source and photodetectors according to an embodiment of the present invention.
Figure 19:
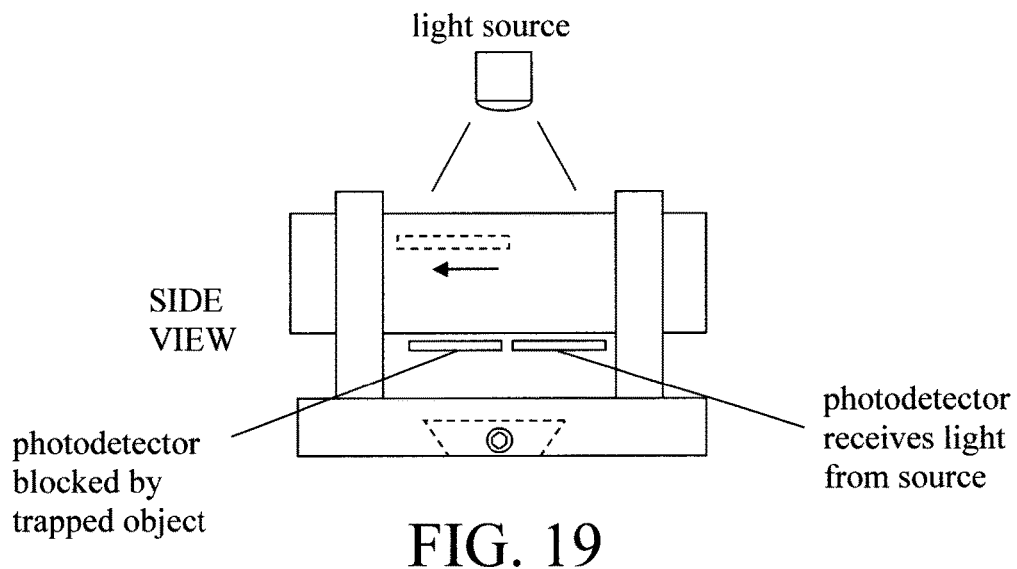
FIG. 19 is a diagram illustrating a side view of the PDL trap with the gap g and the light source and photodetectors being used to detect one position of the tapped object according to an embodiment of the present invention.

The light source and the photodetectors can be used to determine the position of the object in the trap. Namely, as described for example in U.S. patent application Ser. No. 14/826,934 by Gunawan et al., entitled "Parallel Dipole Line Trap Viscometer and Pressure Gauge," the contents of which are incorporated by reference as if fully set forth herein, movement (in this case oscillations) of the trapped object in the PDL trap can be monitored. By providing a (line-of-sight) gap g for the light source and the photodetectors between the magnets, the position of the object in the trap can be easily determined. Namely, as shown in FIG. 18, as the object moves within the trap it passes between the light source and the photodetectors. In this example, there are two photodetectors shown. However, this is for illustrative purposes only, and more (or fewer) photodectors can be employed as needed. If the object moves to the left side of the trap it will block light from the source from reaching the photodetector on the left. See FIG. 19. However, as shown in FIG. 19, light from the source will reach the photodetector on the right.

Figure 20:
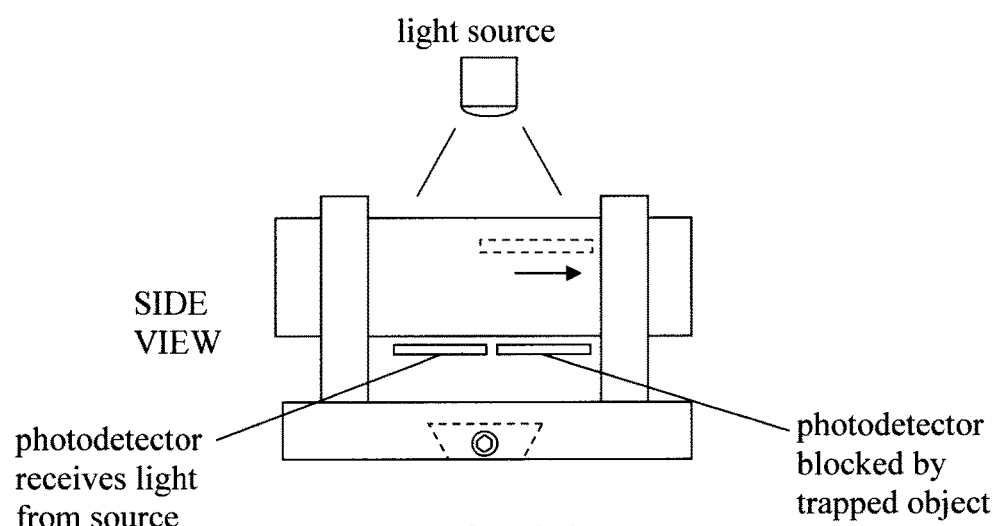
FIG. 20 is a diagram illustrating a side view of the PDL trap with the gap g and the light source and photodetectors being used to detect another position of the tapped object according to an embodiment of the present invention.

If the object moves to the right side of the trap it will block light from the source from reaching the photodetector on the right. See FIG. 20. However, as shown in FIG. 20, light from the source will reach the photodetector on the left.

Figure 21:
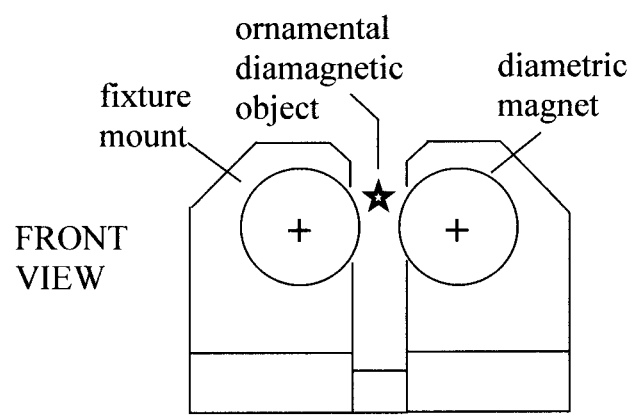
FIG. 21 is a diagram illustrating a front view of a PDL trap where the levitated object has an ornamental shape according to an embodiment of the present invention.
Figure 22:
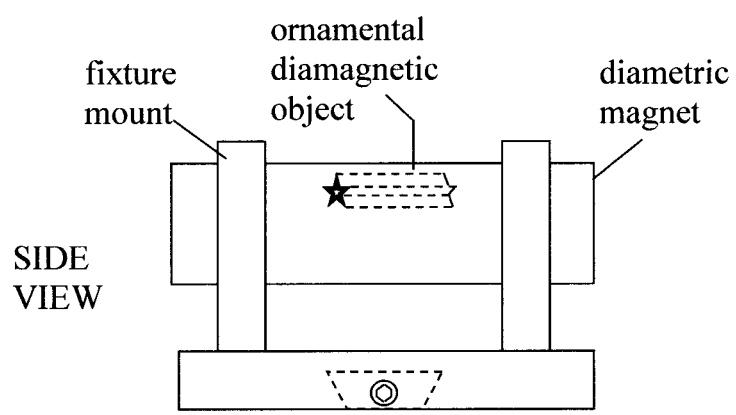
FIG. 22 is a diagram illustrating a side view of the PDL trap where the levitated object has an ornamental shape according to an embodiment of the present invention.

As provided above, the trapped object can be a rod, such as a cylindrical graphite rod. However, the trapped object can be any elongated diamagnetic object. See, for example, FIG. 21 (front view) and FIG. 22 (side view) where the levitated object has an ornamental shape (in this example a cross-sectional star shape). In practice, the graphite rod can be sculpted or molded into any ornamental shape that still allows levitation and stable trapping. Some potential uses of this embodiment include, but are not limited to, ornamental displays where the trapped object is levitated above the magnets. By way of example only, graphite could be sculpted or could even be molded into the desired shape, e.g., by 3D printing. In principle the object can be any shape as long as it can be levitated in a stable condition. To use a simple, non-limiting example, the object can be formed/sculpted into the design of a space ship, an airplane, a train, etc.

Figure 23:
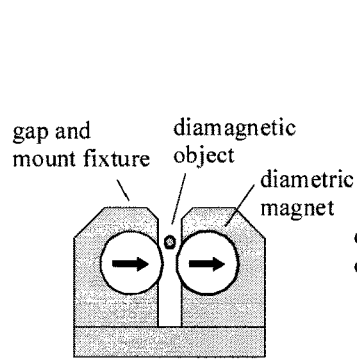
FIG. 23 is a diagram illustrating a front cross section view of a PDL trap whose longitudinal axis is curved, e.g., arc-like according to an embodiment of the present invention.
Figure 24:
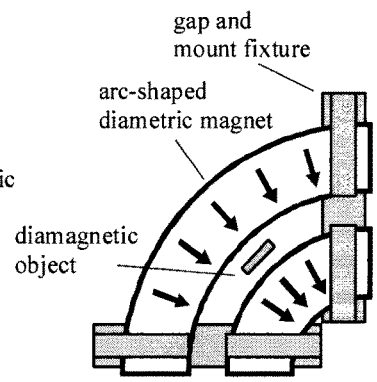
FIG. 24 is a diagram illustrating a top view of the PDL trap with an arc-like longitudinal axis according to an embodiment of the present invention.
Figure 25:
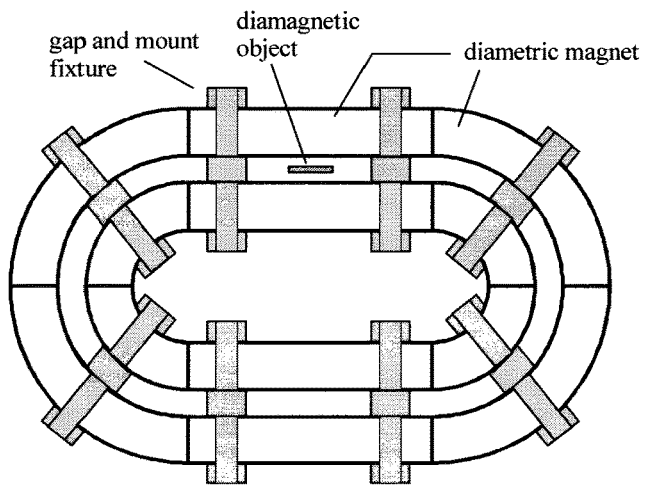
FIG. 25 is a diagram illustrating a top view of multiple segments of PDL trap with straight and arc-like longitudinal axis joined together forming a dipole line track according to an embodiment of the present invention.

In the above examples the PDL traps are formed using dipole line magnets with straight longitudinal axes (e.g., as is the case where the magnets are in the shape of a cylinder). This is not, however, a requirement. For instance, embodiments are anticipated herein where the dipole line magnets are curved, such as the arc-like shaped dipole magnets shown in FIG. 23 (front cross-sectional view) and 24 (top view). As shown in FIGS. 23 and 24, the system can be mounted in a gap and mount fixture system at various different configurations. Therefore, PDL trap segment can be achieved having various longitudinal axis shapes, e.g., straight and/or arc-like. The radius of curvature of the arc-like dipole line magnet is determined by the length of the diamagnetic rod to be trapped, as the rod needs to travel freely in between the magnets without touching their surface. Using this condition, the minimum radius of curvature (measured at the center longitudinal axis of the magnet) can be expressed as: $R > (l^2 - g^2)/2g - a$, where l is the length of the diamagnetic rod and g is the gap between the magnets. In this regard, various segments of the straight and/or arc-like PDL traps can be combined to build a bigger trap system or "dipole line track" as shown, e.g., in FIG. 25. In this system the diamagnetic object is still trapped in between the dipole line magnets but freely moves along the track lines.

Figure 26A:
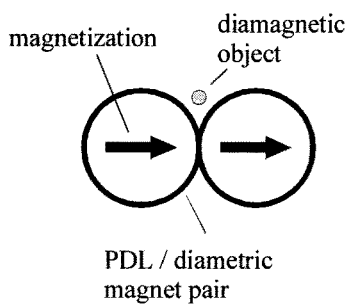
FIG. 26A is a diagram illustrating cylindrical diametric magnets according to an embodiment of the present invention.
Figure 26B:
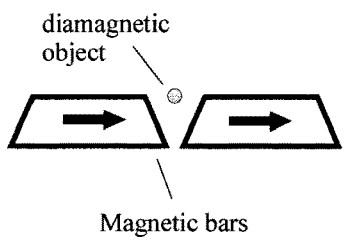
FIG. 26B is a diagram illustrating bar magnets according to an embodiment of the present invention.

As provided above, the magnets of the present PDL traps can have an elongated shape such as a cylinder, bar, or stripe, whose magnetization is in the transverse direction (perpendicular to the long axis). An example of these magnets are shown (in cross-section) in FIGS. 26A and 26B depicting cylindrical diametric magnets and bar magnets, respectively. All of these magnets have magnetization perpendicular to their long axes (e.g., in the examples depicted in FIGS. 26A and 26B, the long axis would be facing into and out of the page).

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A parallel dipole line (PDL) trap, comprising:
a pair of dipole line magnets separated from one another by a variable gap g;
a diamagnetic object levitating above the dipole line magnets, wherein the gap g is less than a critical gap $g_c$ beyond which the diamagnetic object is no longer levitated, and wherein the gap g determines a height by which the diamagnetic object levitates above the dipole line magnets; and
a fixed or a variable gap fixture in which the dipole line magnets are affixed to separate mounts, wherein each of the dipole line magnets is cylindrical, wherein the mounts only partially surround a circumference of each of the dipole line magnets such that the mounts are in a non-contact position with the dipole line magnets at a center of the PDL trap in between the dipole line magnets, and wherein the mounts are affixed only to ends of each of the dipole line magnets and only partially surround the circumference of each of the dipole line magnets at the ends of each of the dipole line magnets.

2. The PDL trap of claim 1, wherein the diamagnetic object comprises a diamagnetic rod.

3. The PDL trap of claim 2, wherein the diamagnetic rod comprises a graphite rod.

4. The PDL trap of claim 1, wherein the diamagnetic object is an elongated diamagnetic object having an ornamental shape.

5. The PDL trap of claim 1, further comprising:
a light source above the dipole line magnets; and
at least one photodetector beneath the dipole line magnets, wherein the at least one photodetector is in line of site of the light source via the gap g separating the dipole line magnets.

6. The PDL trap of claim 5, wherein the light source is selected from the group consisting of: an incandescent light bulb, a light emitting diode, a laser, and combinations thereof, and wherein the photodetector is selected from the group consisting of: a semiconductor photodetector, a light-dependent-resistor, and combinations thereof.

7. The PDL trap of claim 1, wherein a longitudinal axis of the dipole line magnets is straight.

8. The PDL trap of claim 1, wherein the dipole line magnets are curved.

9. A system, comprising:
multiple PDL traps combined to form a dipole line track system,
wherein each of the PDL traps comprises a pair of dipole line magnets separated from one another by a variable gap g, a diamagnetic object levitating above the dipole line magnets, wherein the gap g is less than a critical gap $g_c$ beyond which the diamagnetic object is no longer levitated, and wherein the gap g determines a height by which the diamagnetic object levitates above the dipole line magnets, and a fixed or a variable gap fixture in which the dipole line magnets are affixed to separate mounts, wherein each of the dipole line magnets is cylindrical, wherein the mounts only partially surround a circumference of each of the dipole line magnets such that the mounts are in a non-contact position with the dipole line magnets at a center of the PDL trap in between the dipole line magnets, and wherein the mounts are affixed only to ends of each of the dipole line magnets and only partially surround the circumference of each of the dipole line magnets at the ends of each of the dipole line magnets, and wherein the dipole line magnets of at least one of the PDL traps are curved.

10. A method of operating a PDL trap, comprising the steps of:
providing the PDL trap having a pair of dipole line magnets, a diamagnetic object levitating above the dipole line magnets, and a fixed or a variable gap fixture in which the dipole line magnets are affixed to separate mounts, wherein each of the dipole line magnets is cylindrical, wherein the mounts only partially surround a circumference of each of the dipole line magnets such that the mounts are in a non-contact position with the dipole line magnets at a center of the PDL trap in between the dipole line magnets, and wherein the mounts are affixed only to ends of each of the dipole line magnets and only partially surround the circumference of each of the dipole line magnets at the ends of each of the dipole line magnets; and
opening a gap g between the dipole line magnets, wherein the gap g is less than a critical gap $g_c$ beyond which the diamagnetic object is no longer levitated, and wherein the gap g determines a height by which the diamagnetic object levitates above the dipole line magnets.

11. The method of claim 10, further comprising the step of:
varying the gap g to change a height by which the diamagnetic object levitates above the dipole line magnets.

12. The method of claim 10, wherein the diamagnetic object comprises a diamagnetic rod.

13. The method of claim 10, wherein the diamagnetic object is an elongated diamagnetic object having an ornamental shape.

14. The method of claim 10, wherein the PDL trap further comprises a light source above the dipole line magnets, and at least one photodetector beneath the dipole line magnets, and wherein the at least one photodetector is in line of sight of the light source via the gap g separating the dipole line magnets, the method further comprising the step of:
determining a position of the diamagnetic object in the PDL trap using the light source and the photodetector.

* * * * *